(12) United States Patent  
Takeuchi et al.

(10) Patent No.: US 6,744,949 B2  
(45) Date of Patent: Jun. 1, 2004

(54) SINGLE-ELEMENT OPTICAL WAVELENGTH BANDPASS FILTER FORMED IN OPTICAL FIBER OR OPTICAL WAVEGUIDE AND METHOD OF MANUFACTURE THEREOF

(75) Inventors: Yoshinori Takeuchi, Tama (JP); Shinichi Wakabayashi, Sagamihara (JP)

(73) Assignee: Matsushita Electric Industrial Co., Ltd. (JP)

( * ) Notice: Subject to any disclaimer, the term of this patent is extended or adjusted under 35 U.S.C. 154(b) by 203 days.

(21) Appl. No.: 09/963,588

(22) Filed: Sep. 27, 2001

(65) Prior Publication Data

US 2002/0044743 A1 Apr. 18, 2002

(30) Foreign Application Priority Data

Oct. 12, 2000 (JP) .................... 2000-311582  
Jul. 4, 2001 (JP) .................... 2001-203032

(51) Int. Cl.[7] .................................. G02B 6/34  
(52) U.S. Cl. ........................................ 385/37  
(58) Field of Search ............................ 385/37

(56) References Cited

U.S. PATENT DOCUMENTS 5,887,094 A * 3/1999 Bakhti et al. ............ 385/28  
5,982,963 A * 11/1999 Feng et al. .............. 385/37  
6,021,242 A * 2/2000 Harumoto et al. ....... 385/37  
6,081,640 A 6/2000 Ouellette et al. ........ 385/37  
2001/0048788 A1 * 12/2001 Xie et al. ................. 385/37

FOREIGN PATENT DOCUMENTS

| EP | 0 893 712 A2 | 1/1999 |
| EP | 0 933 662 A1 | 8/1999 |
| EP | 0 997 764 A1 | 5/2000 |
| EP | 1 024 391 A1 | 8/2000 |
| JP | 9-311238 | 12/1997 |
| WO | WO 99/67668 | 12/1999 |

* cited by examiner

Primary Examiner—Akm Enayet Ullah  
Assistant Examiner—Michelle R. Connelly-Cushwa  
(74) Attorney, Agent, or Firm—Parkhurst & Wendel, L.L.P.

(57) ABSTRACT

An optical wavelength filter having one or more bands of transmission wavelengths of light, within a reflection spectrum of the filter, is formed using a section of an optical fiber as an optical fiber grating. The optical fiber core is configured with a periodically varying diffraction coefficient structure formed such that the grating pitch continuously varies in a fixed direction, with that structure containing one or more regions of interruption of the continuous variation of pitch, whereby the bands of transmission wavelengths are respectively defined by these interruption regions.

10 Claims, 11 Drawing Sheets

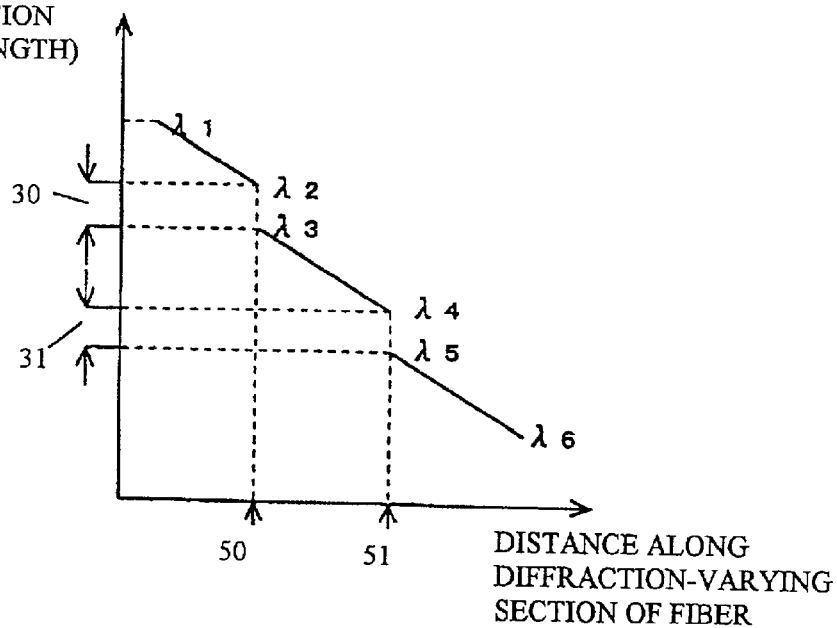
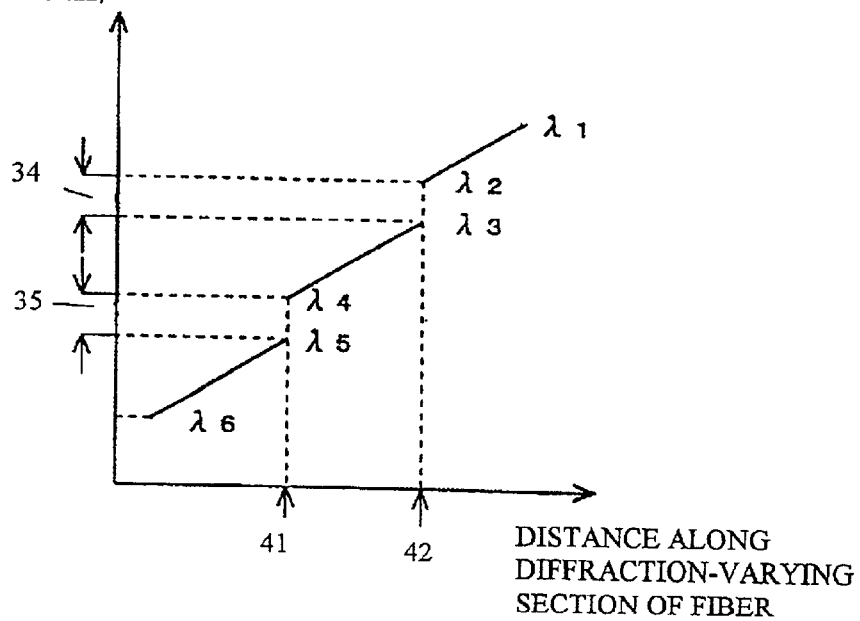

SINGLE-ELEMENT OPTICAL WAVELENGTH BANDPASS FILTER FORMED IN OPTICAL FIBER OR OPTICAL WAVEGUIDE AND METHOD OF MANUFACTURE THEREOF

BACKGROUND OF THE INVENTION

Field of Application

The present invention relates to an optical wavelength filters for operating on light which propagates through an optical fiber or an optical waveguide. In particular, the invention relates to a form of optical wavelength bandpass filter whereby one or more narrow bands of wavelengths of light are transmitted through the filter, these bands being within a range of reflection wavelengths of the filter.

There are various types of optical wavelength filter, for reflecting or transmitting light of specific wavelengths, such as for example filters which utilize multi-layer reflective films, filters which use optical waveguide arrays, filters which use optical fiber gratings, etc. Of these, the optical fiber grating type of filter is most easily matched to use with an optical fiber as a transmission path, by comparison with other types of optical wavelength filters.

A type of optical fiber grating is known which is manufactured by using ultraviolet light to modify the diffraction coefficient within a section of the core of an optical fiber, such that the diffraction coefficient periodically varies along that section with a specific pitch. A corresponding narrow-band reflection spectrum is thereby obtained. If such a filter is directly inserted into a light path, then a narrow-band type of band rejection filter is obtained. However if such an arrangement is to be used to configure an optical wavelength filter, which is required to have one or more channels (i.e., respective bands of wavelengths which are passed by the filter, within a range of reflection wavelengths) then as shown in FIG. 8, it has been necessary in the prior art to use an additional element, i.e., an optical circulator 101. The light which is propagated through the optical fiber first passes through the optical circulator 101, to fall upon the optical fiber grating 102. Light of a specific range of wavelengths is reflected, while the remaining light is passed unchanged through the optical fiber grating 102. The reflected light is returned to the optical circulator 101, and passes out from the exit port 104, as emitted light 105. In that way, by using the emitted light 105 as the output light, the arrangement of FIG. 8 can be used as an optical wavelength bandpass filter which utilizes an optical fiber grating.

By using an optical fiber grating that is formed with a plurality of periodically varying diffraction coefficient regions, having respectively different values of period of variation of the diffraction coefficient, such a technique enables a multi-channel bandpass optical wavelength filter (or a multi-channel band rejection optical wavelength filter) to be obtained.

As another aspect of the prior art, it is known that a "chirped" type of optical fiber grating can be used to obtain a wide-band reflection spectrum. With such a type of optical wavelength filter, the period of variation of the diffraction coefficient is continuously changed within the region of periodic variation of diffraction coefficient. That period of variation constitutes the grating pitch of the optical fiber grating. By altering the manner in which the grating pitch changes, an arbitrary reflection spectrum can be obtained. The chirped type of optical fiber grating is also a reflection type of device as described for prior art types of optical wavelength filter hereinabove. Hence, such a device is inserted directly in a light transmission path, to provide a band rejection optical filter. Thus, in the same way as described above, it is necessary to combine such a device with an optical circulator if it is required to implement a bandpass optical wavelength filter.

Hence, although an optical wavelength filter using an optical fiber grating has the advantage of compatibility with optical fibers, such a filter has the disadvantage that when used as a bandpass filter, it becomes necessary also use an optical circulator. By comparison with an optical fiber grating, an optical circulator-is an expensive item to manufacture. This problem of increased cost is therefore an obstacle to using such a type of filter, in addition to the disadvantage of having to use one additional element.

SUMMARY OF THE INVENTION

It is an objective of the present invention to overcome the disadvantages of the prior art set out above, by providing an optical wavelength filter using an optical fiber grating, whereby an optical wavelength bandpass filter can be realized without the need to use an optical circulator, so that a low-cost single-element bandpass filter can be achieved, for use in applications such as selection of optical communication channels.

It is a further objective to provide a simple method of manufacture for such a filter.

It is a further objective to provide a dynamically controllable type of optical wavelength filter, whereby the bandpass characteristics of the filter can be directly controlled by a user, rather than being fixedly determined at the stage of manufacture.

To achieve the above objectives, the invention provides a bandpass optical wavelength filter whereby the core or the cladding (or both the core and the cladding) of an optical fiber or an optical waveguide is formed with a periodically varying diffraction coefficient structure, with one or a combination of parameters of that structure continuously varying between opposing ends of that structure, such as to define a range of wavelengths of light which are reflected by the filter (referred to in the following as the reflection range), while in at least one location within the periodically varying diffraction coefficient structure a portion is formed (referred to in the following as an interruption portion) in which an interruption of the continuous variation of said parameter or parameter combination occurs. As a result, a corresponding narrow band of transmission wavelengths of the filter lying within the reflection range, i.e., a passband, is created. By using this technique, a single-element optical wavelength bandpass filter having one or more narrow passbands can be formed.

The invention discloses various ways in which a periodically varying diffraction coefficient structure having such interruption portions formed therein can be implemented. According to a first aspect of the invention, the pitch of the periodically varying diffraction coefficient structure, i.e., the grating pitch, is configured to continuously vary along that structure, and each passband portion consists of an interruption region within that structure, having a specific length, extending along the direction of propagation of light through the optical fiber or optical waveguide. Within an interruption region, no change in the pitch occurs. As a result, for each such interruption region, a specific range of wavelengths of light, within a reflection range, will be transmitted through the optical waveguide or optical fiber, with that transmission range of wavelengths being determined by the respective values of pitch immediately prior to the start of that interruption region and immediately following the end of the region.

According to a second aspect, the pitch is again continuously varied, and each of the passband portions consists of a discontinuity in the continuous variation of the pitch, defined at a specific position along the periodically varying diffraction coefficient structure. For each of these discontinuities, there is a corresponding range of wavelengths of light which will be passed by the optical waveguide or optical fiber, with that range determined by the respective values of pitch which occur immediately before and immediately following the discontinuity.

According to a third aspect, the periodically varying diffraction coefficient structure is formed with a fixed pitch, and the average value of diffraction coefficient within the periodically varying diffraction coefficient structure continuously varies along the direction of propagation of light through the optical waveguide or optical fiber. In that case, each of the passband portions consists of a discontinuity in the continuous variation of the average value of diffraction coefficient. For each of these discontinuities there is a corresponding range of light wavelengths which will be passed through the optical waveguide or optical fiber, i.e., a passband which is determined by the respective average values of diffraction coefficient which occur immediately before and immediately following the position of discontinuity.

Alternatively, according to a fourth aspect, the periodically varying diffraction coefficient structure is formed with a fixed pitch and the average value of diffraction coefficient within the periodically varying diffraction coefficient structure continuously varies along the direction of propagation of light through the optical waveguide or optical fiber. However in this case, each of the passband portions consists of an interruption region having a specific length extending along the propagation direction, in which the continuous variation of the average value of diffraction coefficient is interrupted. For each of these interruption regions there is a corresponding range of light wavelengths which will be passed through the optical waveguide or optical fiber, i.e., a passband which is determined by the respective average values of diffraction coefficient which occur at the opposing ends of that interruption region.

According to a fifth aspect, the features of successively varying the pitch and also the average value of diffraction coefficient along the periodically varying diffraction coefficient structure are combined, and each of the interruption portions is configured as an interruption region, in which both the continuous variation of the pitch and also of the average value of diffraction coefficient are interrupted.

According to a sixth aspect, the configuration is as described for the fifth aspect, other than in that each of the interruption portions consists of a discontinuity, at which both the continuous variation of the pitch and also of the average value of diffraction coefficient are interrupted.

In addition, the invention provides a simple method of manufacturing an optical waveguide or optical fiber in which one or more of the above-mentioned interruption regions are formed. The method utilizes a phase mask, with ultraviolet light passing through the phase mask to reach the optical waveguide or optical fiber, thereby producing periodic modulation of the diffraction coefficient, and with masking means provided for blocking the ultraviolet light from being incident on the optical waveguide or optical fiber at each of the aforementioned interruption regions.

According to another aspect, the invention provides an optical wavelength bandpass filter whose filter characteristics can be dynamically adjusted by a user, through selective application of heat generate by an array of heater elements disposed on an optical fiber or optical waveguide, to thereby produce alterations of diffraction coefficient such as to obtain a desired configuration for a periodically varying diffraction coefficient structure having one or more interruption portions which are defined based on any of the various possible configurations of an optical wavelength filter according to the present invention as summarized above.

It should be understood that the term "continuous variation" of a parameter of the periodically varying diffraction coefficient structure (continuous variation of pitch, and/or of average value of diffraction coefficient), is used in the following description and in the appended claims to signify a continuous variation of the parameter with respect to distance along that structure, specifically, continuous increase in value of that parameter between one end of the structure and the opposing end of the structure.

BRIEF DESCRIPTION OF THE DRAWINGS

FIG. 6 is a graph illustrating the relationship between grating pitch and position along a section of the optical fiber of the second embodiment in which the diffraction coefficient of the core varies periodically with a continuously varying pitch, with one or more positions of discontinuity of the continuous variation of the pitch being formed;

FIG. 8 is a graph illustrating the relationship between average value of diffraction coefficient and position along a section of the optical fiber of the third embodiment, in which periodic variation of the diffraction coefficient occurs with a fixed pitch and the average value of diffraction coefficient varies continuously, with one or more positions of discontinuity of the continuous variation of that average value being formed;

DESCRIPTION OF PREFERRED EMBODIMENTS

First Embodiment

Figure 1:
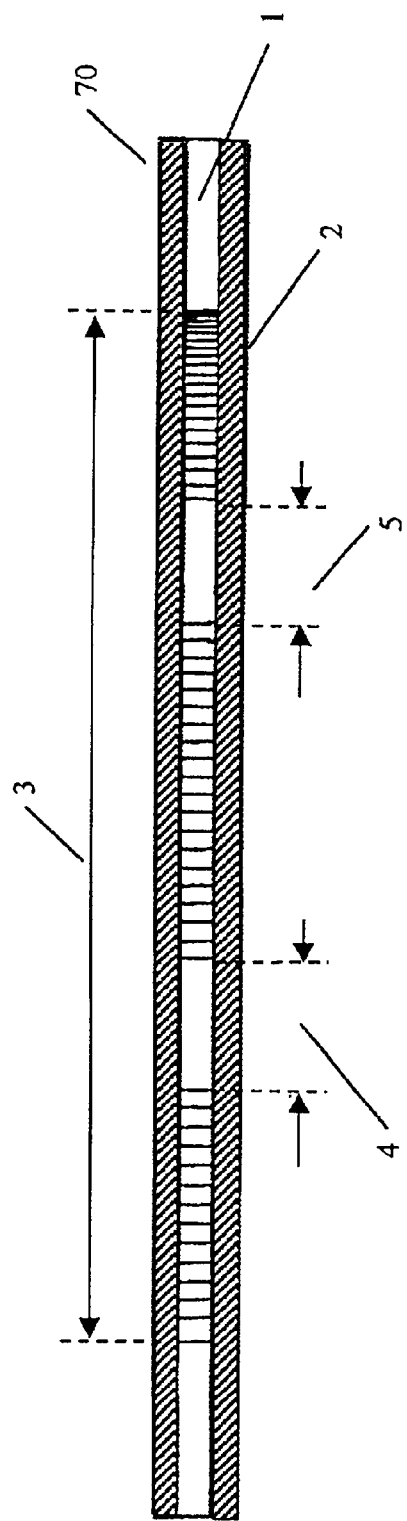
FIG. 1 is a cross-sectional view of an optical fiber of a first embodiment of an optical wavelength filter.

A first embodiment of an optical wavelength filter will be described referring to FIG. 1 of the drawings. This is a cross-sectional view of an optical fiber 70 having a core 1 and cladding 2, with a section of the core 1 configured with a periodically varying diffraction coefficient structure 3 having a variation period, i.e., the grating pitch of the periodically varying diffraction coefficient structure (referred to in the following simply as the pitch) which continuously changes in a fixed direction along the periodically varying diffraction coefficient structure 3, to thereby form an optical fiber grating having a fixed range of reflection wavelengths. In addition, the periodically varying diffraction coefficient structure contains interruption regions 4, 5, in each of which the continuous variation of the pitch is interrupted. The interruption regions 4, 5 extend along the core 1, and are of respective predetermined lengths and located at respective predetermined positions within the periodically varying diffraction coefficient structure 3.

Figure 2:
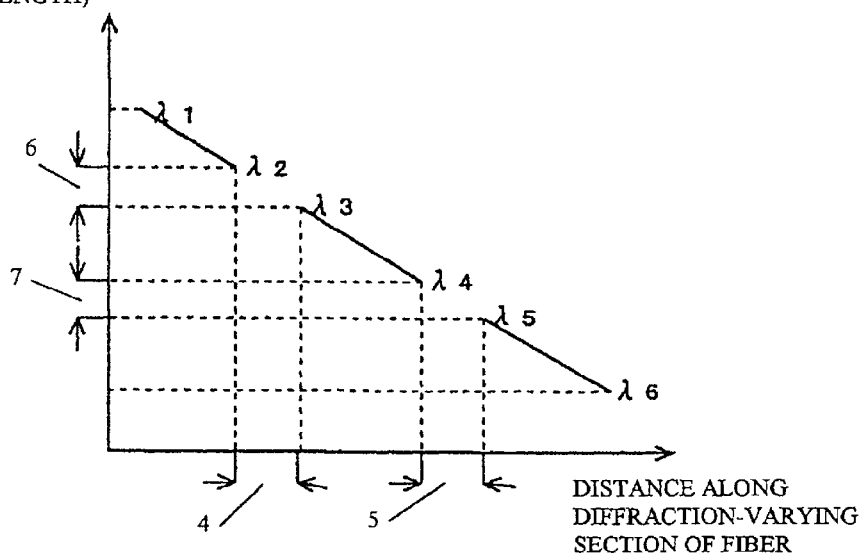
FIG. 2 is a graph illustrating the relationship between grating pitch and position along a section of the optical fiber of the first embodiment in which the diffraction coefficient of the core varies periodically with a continuously varying pitch, with regions of interruption of the continuous variation of the pitch being formed.
Figure 3:
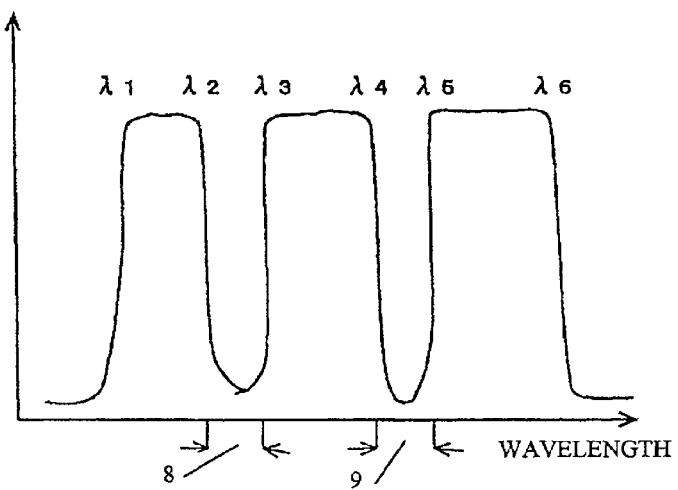
FIG. 3 is a diagram showing an example of the optical transmission characteristics of the first embodiment.

FIG. 2 is a graph showing the relationship between positions along the periodically varying diffraction coefficient structure 3 of the optical fiber of FIG. 1 and the optical fiber grating pitch. The wavelengths of light entering the core of the optical fiber which are reflected by the optical fiber are determined by the grating pitch and by the average value of diffraction coefficient, in combination. With this embodiment, the reflection wavelength varies in direct proportion to the grating pitch, which can be achieved for example by making the average value of diffraction coefficient constant throughout the periodically varying diffraction coefficient structure.

In the optical fiber of the first embodiment, as viewed in FIG. 1, the grating pitch linearly decreases from the left-hand to the right-hand end of the periodically varying diffraction coefficient structure 3. Hence, the vertical axis in FIG. 2 can be considered as corresponding both to values of grating pitch and also to values of reflection wavelength. That is to say, referring to FIG. 1, light at short wavelengths which enters the optical fiber core will be reflected when it is in the vicinity of the right-hand end of the optical fiber, while light at longer wavelengths will be reflected when it reaches the vicinity of the left-hand end of the optical fiber.

Within the interruption regions 4 and 5, which correspond respectively to the ranges of grating pitch values denoted by numerals 6 and 7, in FIG. 2, since the continuous variation of the grating pitch is interrupted, a passband (corresponding to the range 6 of pitch values) extending from the wavelength λ2 to the wavelength λ3, and a passband (corresponding to the range 7 of pitch values) extending from the wavelength λ4 to the wavelength λ5 are formed, i.e., respective narrow ranges in the spectrum of optical wavelengths, to which the filter is transparent. The range of wavelengths constituting each passband is determined by the values of grating pitch which occur immediately prior to and immediately subsequent to the corresponding one of the interruption regions (i.e., immediately adjacent to the right and left ends respectively of an interruption region, as viewed in FIG. 1).

Hence with this embodiment, passbands can be formed as required, within a reflection band which extends from the wavelength λ1 to the wavelength λ6. Thus, without requiring the use of an expensive additional component such as an optical circulator, simply by inserting the optical fiber shown in FIG. 1 into the transmission path of a light beam, an optical wavelength filter is realized which has two channels, i.e., two narrow passbands. The number of passbands can be increased simply by inserting corresponding additional ones of the regions of interruption of the periodically varying diffraction coefficient structure, such as the regions 4, 5 in FIG. 1. The width of a passband can be arbitrarily modified by adjusting the width of the corresponding one of these interruption regions, or by adjusting the rate of change of grating pitch of the periodically varying diffraction coefficient structure.

It thus becomes possible to provide almost all of the multi-channel optical wavelength filters that might be required in an optical communication system, using simple and inexpensive components, i.e., a system can be implemented which is based on single-element multi-channel optical wavelength filters, each integrally formed in an optical fiber or optical waveguide.

Figure 4:
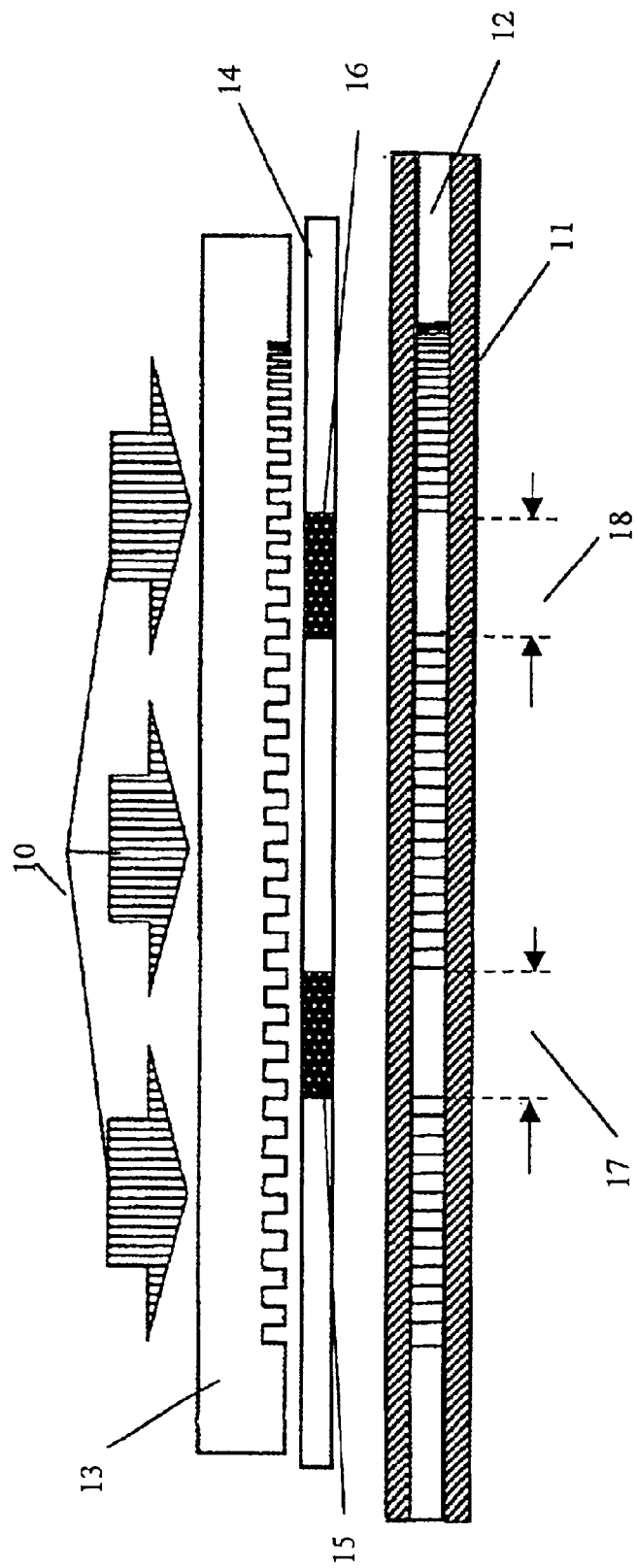
FIG. 4 is a diagram for use in describing a method of manufacture of the first embodiment.

FIG. 4 is a diagram for showing a method of manufacture of the optical fiber grating shown in FIG. 1. As is well known, the diffraction coefficient of the core of an optical fiber can be increased by illuminating the core with ultraviolet radiation, and this can be used as a basis for a method of manufacture of an optical wavelength filter of the form shown in FIG. 1. In FIG. 4, an optical fiber 11 has a core 12. To form the periodically varying diffraction coefficient structure within the optical fiber core 12, a source of ultraviolet light 10 having a suitable intensity distribution is disposed close to the core 12, with a phase mask 13 and a blocking mask 14 successively disposed between the source of the ultraviolet light 10 and the optical fiber 11.

The use of a phase mask in this way to produce an optical fiber grating or an optical waveguide grating is well known, i.e., by transmitting ultraviolet light through the mask to generate an optical interference pattern in the form of successive variations in diffraction coefficient, resulting from a pattern that has been formed in the phase mask, and with the grating pitch being determined by the mask pattern. In FIG. 4, that method is utilized to form a periodically varying diffraction coefficient structure in the core 12, determined by the pattern of the phase mask 13. In that way a periodically varying diffraction coefficient structure having a desired manner of variation of grating pitch can be formed in the core 12, i.e., a structure in which the grating pitch continuously decreases from one end of the structure to the other, as described for the first embodiment hereinabove.

In addition, as a result of the blocking mask 14 being disposed between the phase mask 13 and the optical fiber 11, with the blocking mask 14 having opaque regions 15, 16 formed therein, interruption regions 17, 18 respectively corresponding to the opaque regions 15, 16 are formed in the periodically varying diffraction coefficient structure of the core 12, i.e., regions in which interruption of the continuous variation of the grating pitch occurs.

It can thus be understood that the invention provides a simple method of manufacturing an optical wavelength filter of the form of the first embodiment.

Figure 5:
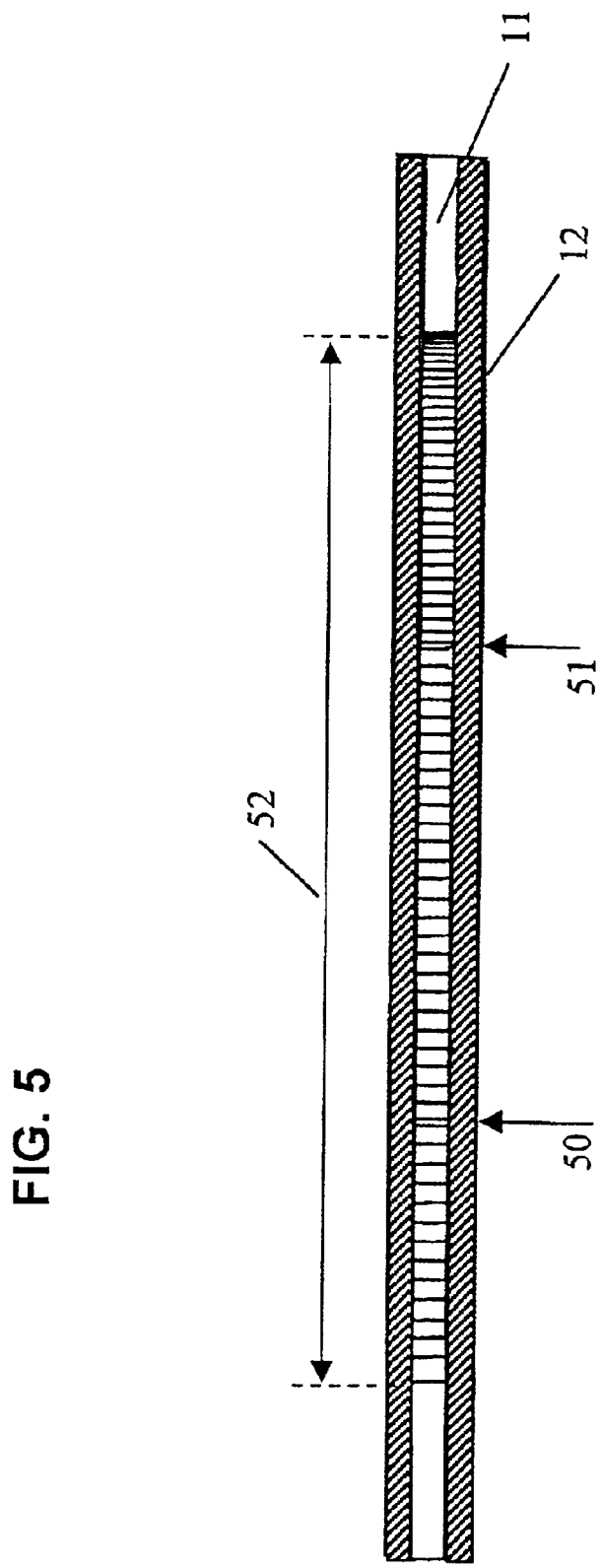
FIG. 5 is a cross-sectional view of an optical fiber of a second embodiment of the invention.

FIG. 5 is a cross-sectional view of a second embodiment of an optical wavelength filter. This embodiment is formed of an optical fiber 12 having a core 11, with a periodically varying diffraction coefficient structure 52 formed in core 11. With this embodiment, the pitch of the periodically varying diffraction coefficient variation structure 52 varies continuously throughout the length of that structure, other than at one or more discontinuities in that continuous variation. Two of such discontinuities are indicated as occurring at points indicated by numerals 50, 51, i.e., at specific positions along the direction of propagation of light through the core 11.

FIG. 6 shows the relationships between positions along the periodically varying diffraction coefficient structure of the core 12 of the optical fiber 11 and the pitch of that structure, with this embodiment. As shown, at the discontinuity point 50, there is an abrupt change in the pitch, through a range of pitch values as indicated by numeral 30. Since there is not a range of continuous variation of pitch that corresponds to the range of wavelengths λ2 to λ3, that range of wavelengths constitutes a passband, formed as a result of the discontinuity at position 50. Similarly, a passband extending from wavelength λ4 to wavelength λ5 is formed, as a result of the discontinuity which is formed at position 51.

It can thus be understood that the range of wavelengths constituting each passband is determined by the respective values of pitch which occur immediately prior to and immediately subsequent to the corresponding one of the discontinuities in the variation of the pitch (i.e., immediately to the left and immediately to the right of the discontinuity point as viewed in FIG. 5).

Hence with this embodiment, as for the first embodiment, an optical wavelength filter is provided in which one or more narrow passbands such as the passbands 4, 5 can be formed as required, within a wide reflection band (extending between the wavelengths λ1 to λ6 in FIG. 6).

This configuration has the advantage that the length of optical fiber that is required for obtaining a desired range of reflected wavelengths can be made shorter than in the case of the first embodiment. It will be understood that a method of manufacture similar to that shown in FIG. 4 could be applied to the second embodiment (i.e., with the blocking mask 14 omitted), by forming the pattern of the phase mask 13 such as to produce the discontinuities in the pitch at requisite positions within the periodically varying diffraction coefficient structure. However the second embodiment has the disadvantage, by comparison with the first embodiment, that the respective positions of the passbands within the range of reflection wavelengths are thereby fixedly determined, and can only be altered by using a different phase mask. With the first embodiment, the positions (within the reflection band of wavelengths) and widths of the passbands can be freely altered, by modifying the sizes and/or positions of the corresponding ones of the opaque regions in the phase mask.

Third Embodiment

A third embodiment will be described, which is also a bandpass type of optical wavelength filter formed of an optical fiber having a periodically varying diffraction coefficient structure formed therein. The embodiment will be described referring first to the cross-sectional view of FIG. 7, in which numeral 40 indicates a periodically varying diffraction coefficient structure which is formed in the core 12 of an optical fiber 11. This embodiment differs from the preceding embodiments in that the pitch of the periodically varying diffraction coefficient structure 40 is fixed, and in that the average value of diffraction coefficient of the core 12 successively varies along the periodically varying diffraction coefficient structure, i.e., along the direction of propagation of light. At each of one or more specific positions along that path, as indicated by numerals 41, 42 in FIG. 7, a discontinuity of that continuous variation of the average value of diffraction coefficient is formed, i.e., an abrupt change between two average values occurs.

Figure 7:
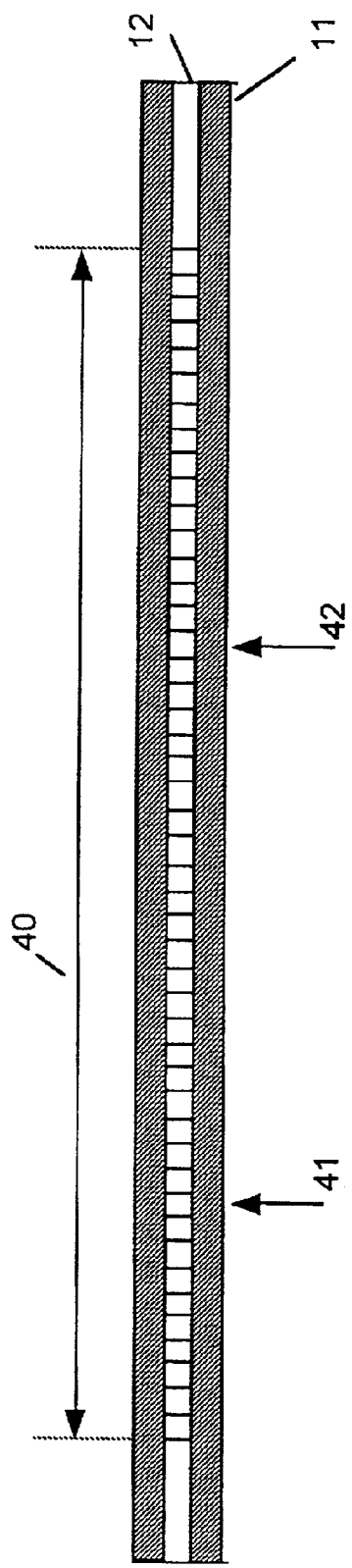
FIG. 7 is a cross-sectional view of an optical fiber of a third embodiment of the invention.

FIG. 8 shows the relationship between positions along the periodically varying diffraction coefficient structure 40 of the optical fiber in FIG. 7 and the average value of diffraction coefficient within that structure. With the pitch fixed, the greater the average value of diffraction coefficient within the periodically varying diffraction coefficient structure, the shorter becomes the reflection wavelength of light that enters the optical fiber. That is to say, there is an inversely proportional relationship between the average value of diffraction coefficient and the reflection wavelength. Thus, in relation to the optical fiber 11 shown in FIG. 7, FIG. 8 can be considered either as showing the variation of average value of diffraction coefficient or the variation of the inverse of the reflection wavelength, along the periodically varying diffraction coefficient structure 40.

By providing discontinuities in the continuous variation of average value of diffraction coefficient at positions such as points 41, 42 shown in FIG. 7, a passband is defined at each of these discontinuity positions, within a wide band of reflection wavelengths. The wavelength range of each passband is determined, at each discontinuity, by the respective values of average diffraction coefficient which occur immediately prior to and immediately following the discontinuity (i.e., in the example of FIG. 7, the average values which occur immediately to the left and right sides of the discontinuity position 40 or 42). For example, since there is a discontinuity at point 42 having a magnitude of change as indicated by numeral 34 in FIG. 8, that change in average diffraction coefficient corresponds to a range of reflection wavelengths extending from λ3 to λ2, so that a passband extending between the wavelengths λ3, λ2 is formed within a wide band of reflection wavelengths extending between λ1 and λ6.

It will be understood that a method of manufacture similar to that shown in FIG. 4 could be applied to the third embodiment (i.e., with the blocking mask 14 omitted), by appropriately adjusting the condition of illumination by the ultraviolet light 10 such as to produce the required continuous variation in the average value of diffraction coefficient along the periodically varying diffraction coefficient structure in the core 12, with one or more discontinuities in that continuous variation of average value of diffraction coefficient. Thus with this embodiment, the advantage is provided that it becomes possible to obtain an optical wavelength bandpass filter having desired bandpass and reflection spectrum characteristics by suitably setting the conditions of illumination with ultraviolet light which is passed through a phase mask during manufacture of the filter, without the need to use different phase masks for various requirements.

Fourth Embodiment

A fourth embodiment will be described referring to the cross-sectional view of FIG. 9, which is an alternative form of the third embodiment. In this case, interruption regions 56, 57 are formed in the periodically varying diffraction coefficient structure in the core 12, i.e., regions in which the continuous variation of the average value of diffraction coefficient is interrupted. Each interruption region results in a corresponding passband, extending between first and second optical wavelengths, with the first optical wavelength being determined by the average value of diffraction coefficient which occurs immediately adjacent to one end of an interruption region and the second optical wavelength being determined by the average value of diffraction coefficient which occurs immediately adjacent to the opposite end of that interruption region.

It will be apparent that this embodiment can readily be manufactured by adapting the method illustrated in FIG. 4 and described hereinabove, by appropriate setting of the illumination conditions of the ultraviolet light, with the blocking mask omitted.

Fifth Embodiment

A fifth embodiment will be described, referring to the cross-sectional view of FIG. 10, which combines the features of the second and third embodiments. This embodiment is formed of an optical fiber 12 with a core 11, and a periodically varying diffraction coefficient structure 60 having a continuously varying pitch formed in the core 11, as described above for the second embodiment referring to FIGS. 5 and 6. However with the fifth embodiment, the average value of diffraction coefficient continuously varies along the periodically varying diffraction coefficient structure 60, as described above for the third embodiment referring to FIGS. 7, 8. Two discontinuities are formed in the periodically varying diffraction coefficient structure 60, at positions indicated by numerals 61, 62. At each of these positions, there is a discontinuity in both the continuous variation of the pitch and also in the continuous variation of the average value of diffraction coefficient. It can be understood that in this case each passband of the filter extends from a first wavelength, which is determined by a combination of the average value of diffraction coefficient and the value of pitch which respectively occur immediately adjacent to one side of a discontinuity point, to a second wavelength, which is determined by a combination of the average value of diffraction coefficient and the value of pitch which respectively occur immediately adjacent to the opposite side of that discontinuity point.

Sixth Embodiment

With a sixth embodiment, which combines the features of the first and third embodiments, the configuration of the filter can be as shown in the cross-sectional view of FIG. 1, i.e., an optical fiber with a periodically varying diffraction coefficient structure 3 having a continuously varying pitch, formed in the core 1, and with one or more interruption regions 4, 5 formed in the periodically varying diffraction coefficient structure 3. However with the sixth embodiment, the average value of diffraction coefficient continuously varies along the periodically varying diffraction coefficient structure, as described above for the third embodiment referring to FIGS. 7, 8. Thus in this case, each interruption region interrupts both the continuous variation of the pitch and also the continuous variation of the average value of diffraction coefficient.

It can be understood that in this case each passband of the filter extends from a first wavelength, which is determined by a combination of the average value of diffraction coefficient and the value of pitch which respectively occur immediately adjacent to one end of an interruption region, to a second wavelength, which is determined by a combination of the average value of diffraction coefficient and the value of pitch which respectively occur immediately adjacent to the opposite end of that interruption region. In addition, the range of reflection wavelengths of a filter according to either of the fifth or sixth embodiments extends from a first wavelength, which is determined by a combination of the grating pitch and the average value of diffraction coefficient at one end of the periodically varying diffraction coefficient structure, to a second wavelength, which is determined by a combination of the grating pitch and the average value of diffraction coefficient at the opposite end of the periodically varying diffraction coefficient structure.

Furthermore, it will be understood that it would be possible to envisage various other combinations of the embodiments described above, so that the invention provides a high degree of flexibility in use.

The invention has been described in the above for the case of using optical fiber to realize an optical wavelength filter. However it will be apparent that similar results could be obtained by using an optical waveguide, having a periodically varying diffraction coefficient structure formed therein as described above.

Furthermore although the above embodiments have been described on the assumption that the periodically varying diffraction coefficient structure is formed in the core of an optical fiber, it would be possible to achieve similar effects by forming that periodically varying diffraction coefficient structure in the cladding of an optical fiber. Alternatively, both the cladding and the core of an optical fiber could be formed with such a periodically varying diffraction coefficient structure.

Moreover it should be understood that other ways of implementing the interruption regions could be envisaged, i.e., it is not essential that there be a complete absence of change of diffraction coefficient within an interruption region, so long as the requisite condition of interruption of the continuous variation of the modulation period and/or of the continuous variation of the average value of diffraction coefficient is satisfied.

Seventh Embodiment

Figure 11:
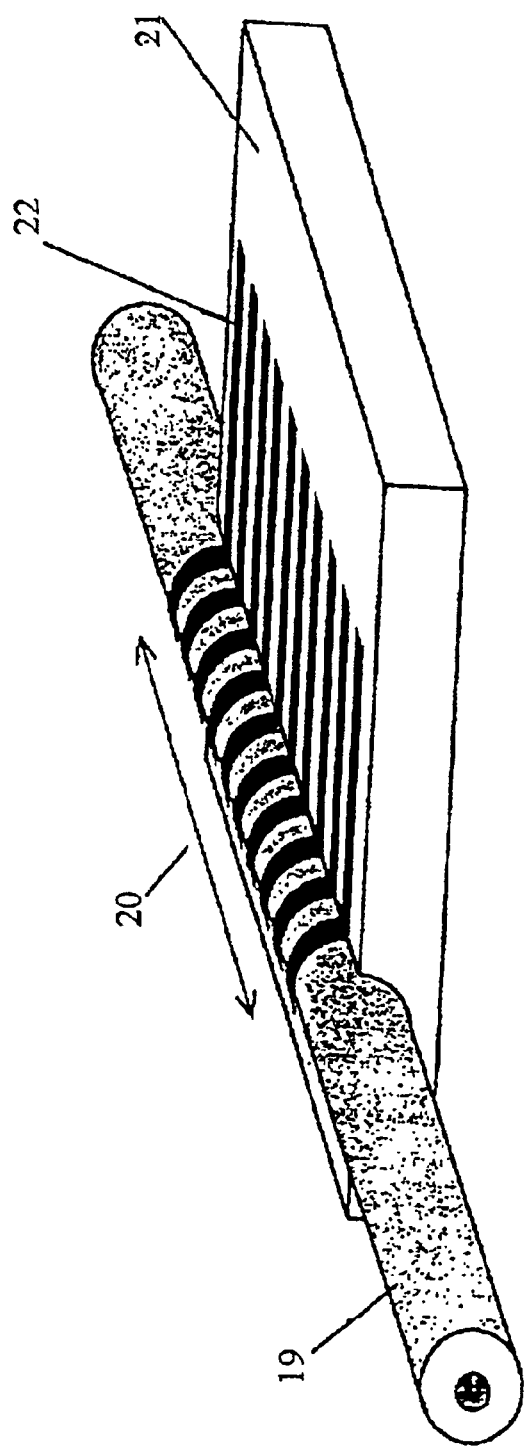
FIG. 11 is an oblique view of an optical fiber of a sixth embodiment, which is an optical wavelength filter provided with an array of stripe-configuration heater elements for enabling controllable adjustment of the filter characteristics.

A seventh embodiment will be described referring first to FIG. 11, which is a conceptual diagram of an optical filter module in which a section 20 of an optical fiber 19 has a periodically varying diffraction coefficient structure controllably formed therein. Whereas each of the preceding embodiments is manufactured to have fixed optical wavelength filter characteristics, the seventh embodiment enables a user to dynamically control these characteristics. The section 20 of the optical fiber 19 is partially embedded in a quartz substrate 21, with a parallel array of strip electrodes, functioning as respective heater elements 22, formed over that section 20 of the optical fiber 19 and upon an adjacent region of the quartz substrate 21. Each of the heater elements 22 is connected to receive a supply of current from a control system (described hereinafter), by connecting leads which are not shown in the drawing. By passing electric currents of appropriate levels through specific ones of the electrodes 22 to effect heating, the temperatures of the parts of the optical fiber which lie immediately below the electrodes 22 can be controlled, producing increases in the diffraction coefficient of those portions of the optical fiber. A dynamically controllable periodically varying diffraction coefficient structure can thereby be formed, i.e., the reflection wavelengths of the section 20 of the optical fiber 19, disposed below the array of heater elements 22, can be altered. Thus, by selectively applying suitable levels of current to respective ones of the electrodes 22, the reflection spectrum of the optical fiber section 20 can be arbitrarily adjusted.

With this embodiment, a heater element control system (described hereinafter) can be operated by a user to determine these respective levels of heating current such as to produce a periodically varying diffraction coefficient structure within the section 20 of the optical fiber 19 which can be configured such that the grating pitch varies as described for any of the preceding embodiments. Thus, this embodiment may be used to achieve similar results to each of the preceding embodiments, but with dynamic control of the optical wavelength bandpass filter characteristics being enabled, by suitably setting the respective levels of current which are passed through the heater elements 22. That is to say, dynamic control, by a user, of the center frequency and width of each passband of such a filter as well as control of the range of reflection wavelengths of the filter becomes possible.

Figure 12:
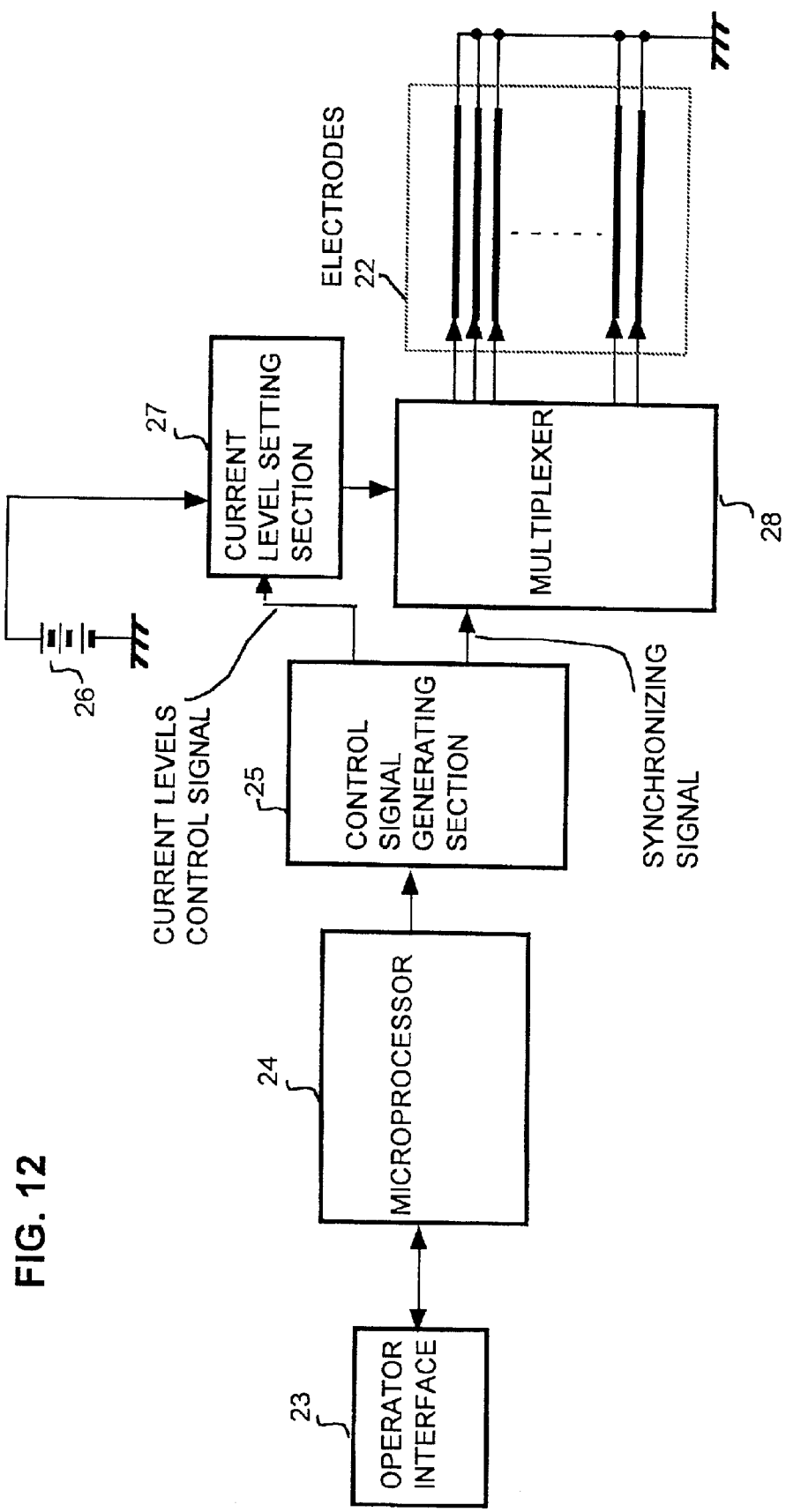
FIG. 12 is a general block diagram of an example of a system for effecting adjustment of the filter characteristics of the sixth embodiment, by control of levels of heating currents which are selectively passed through the heater elements.
Figure 13:
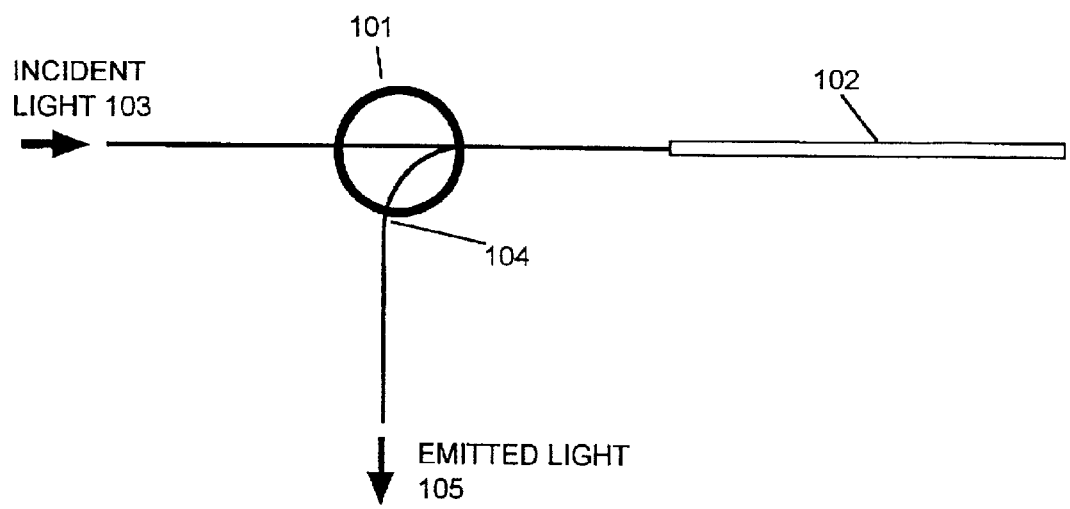
FIG. 13 is a conceptual diagram for describing a prior art method of implementing an optical wavelength bandpass filter.

FIG. 12 is a general system block diagram of an example of a system for enabling a user to control the respective levels of current supplied to the heater elements 22 of this embodiment, to obtain desired characteristics for the optical wavelength bandpass filter. In FIG. 10, an operator interface formed of a keyboard, display device, etc., is connected to a microprocessor 24, for enabling a user to supply input commands to the microprocessor, whereby corresponding output commands (determined by a program that is executed by the microprocessor 24) are supplied to a control signal generating section 25. In response, the control signal generating section 25 supplies a corresponding current levels control signal to a current levels setting section 27, and a synchronizing signal to a multiplexer 28. The multiplexer 28 cyclically selects respective ones of the heater elements 22 to be periodically supplied with a pulse of current that is transferred from a DC power source 26, with the amplitude of the current pulses supplied to a heater element being determined by the state of the current levels control signal at the time when that heater element is selected by the multiplexer 28. The frequency and duty cycle of the pulses supplied to a heater element are fixed. Each of the heater elements 22 can thereby be supplied with electric power at a specific level, determined by the program executed by the microprocessor 24 in conjunction with the operator input commands.

Figure 9:
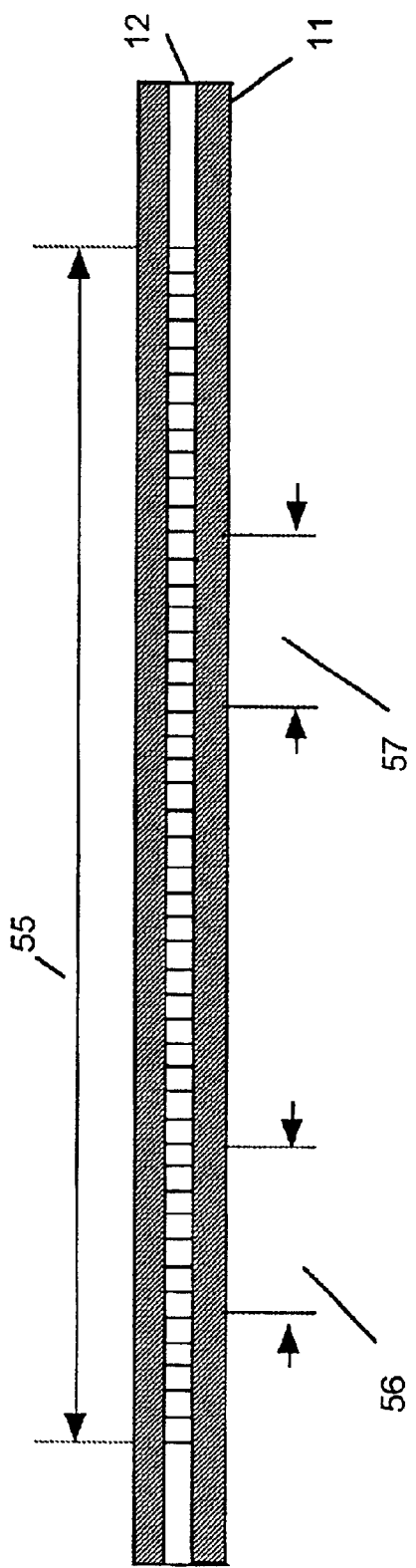
FIG. 9 is a cross-sectional view of an optical fiber of a fourth embodiment, in which periodic variation of the diffraction coefficient occurs with a fixed pitch and the average value of diffraction coefficient varies continuously, with one or more regions of interruption of the continuous variation of that average value being formed.

It will be apparent that a computer program can readily be prepared, for execution by the microprocessor 24, whereby optical wavelength bandpass filter operation as described for any of the preceding embodiments can be implemented by the embodiment of FIG. 9.

The above embodiment has been described for the case of using an optical fiber to implement the optical wavelength bandpass filter. However it will be understood that similar results could be obtained by using an optical waveguide.

Figure 10:
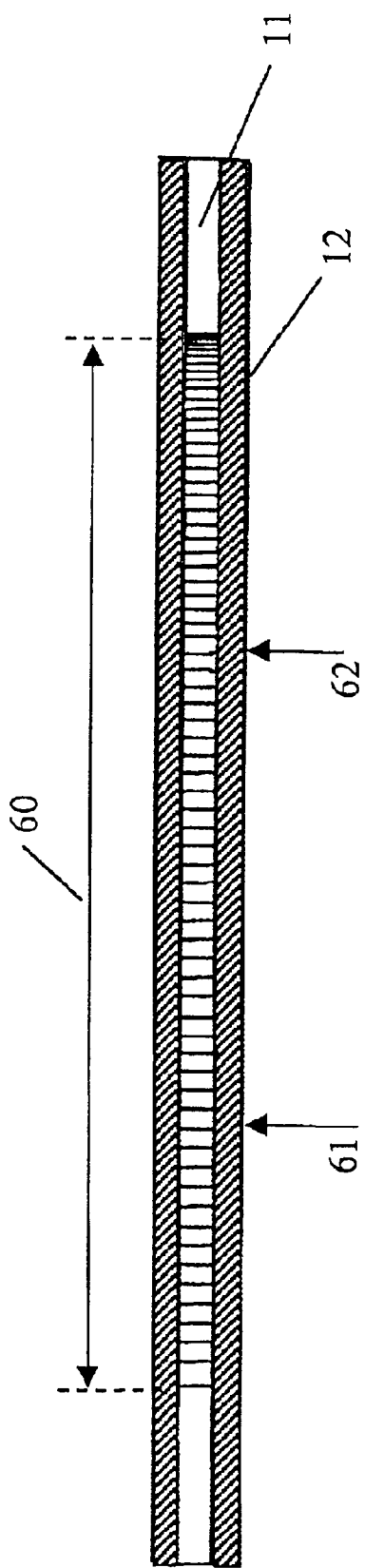
FIG. 10 is a cross-sectional view of an optical fiber of a fifth embodiment, in which in which periodic variation of diffraction coefficient occurs with a continuously varying pitch and the average value of diffraction coefficient varies continuously, with one or more positions of discontinuity of both the continuous variation of the pitch and also of the continuous variation of the average value of diffraction coefficient being formed.

Although the above embodiment has been described on the assumption that the heat generated by a heater element is controlled by the amplitude of current pulses supplied thereto, with these pulses having a fixed frequency and fixed duty cycle, it would of course be equally possible to modify the system of FIG. 10 to supply current pulses having a fixed amplitude, fixed frequency and controlled duty cycle, or pulses having a fixed amplitude, fixed duty cycle and controlled frequency.

Furthermore, the heater control system of FIG. 10 could be modified by providing each of the heater elements 22 with a temperature sensing element such as a thermistor, for providing feedback information to the microcomputer 24 concerning the actual temperatures of the heater elements 22. In that case, the program executed by the microprocessor 24 could use such information to provide more accurate control of the heater elements 22.

Moreover although the above embodiment has been described for the case in which control of the heating current is effected by using current pulses supplied to the heater elements, it would of course be equally possible to use an arrangement in which respective controlled levels of continuous current are supplied to the heater elements.

Furthermore, such dynamic control of the characteristics of an optical wavelength bandpass filter according to the present invention is not limited to the use of heating. It would be possible to obtain similar results by controlled application of mechanical stress or electric fields to the locations in an optical fiber or optical waveguide at which variations in diffraction coefficient are required, for obtaining desired optical wavelength filter characteristics.

As can be understood from the above description of embodiments, the invention enables an optical wavelength bandpass filter which can have one or more narrow passbands which can be defined within a predetermined range of reflection wavelengths, to be realized by using only an optical fiber or optical waveguide type of optical grating, without the need to use additional components such as an optical circulator. It can further be understood that the invention enables such an optical wavelength bandpass filter to be implemented either with the filter characteristics fixedly defined at the stage of manufacture, or such as to enable dynamic control of the filter characteristics.

It should be understood that although the invention has been described in the above referring to specific embodiments, these embodiments are to be taken in a descriptive and not a limiting sense, and that various modifications to the embodiments could be envisaged which fall within the scope claimed for the invention in the appended claims.

What is claimed is:

1. An optical wavelength filter comprising:

an optical fiber or an optical waveguide, having a core and cladding, with at least one of said core and cladding comprising a structure having a periodically varying diffraction coefficient extending along a direction of propagation of light through said filter, and with at least one parameter of said periodically varying diffraction coefficient structure continuously varying along said direction of propagation for creating a range of reflection wavelengths of said filter, wherein said periodically varying diffraction coefficient structure comprises at least one interruption portion interrupting said continuous variation, thereby creating a corresponding passband of said filter, with said passband located at a predetermined position within said range of reflection wavelengths, said periodically varying diffraction coefficient structure has a fixed pitch, said parameter which continuously varies is an average value of a diffraction coefficient of said periodically varying diffraction coefficient structure, and said at least one interruption portion comprises a portion of said periodically varying diffraction coefficient structure at which a transition occurs from a first average value of a diffraction coefficient to a second average value of a diffraction coefficient.

2. The optical wavelength bandpass filter according to claim 1, wherein said interruption portion of said periodically varying diffraction coefficient structure comprises a discontinuity in said continuous variation of a diffraction coefficient, said discontinuity being located at a predetermined position along said periodically varying diffraction coefficient structure.

3. The optical wavelength bandpass filter according to claim 1, wherein said interruption portion of said periodically varying diffraction coefficient structure comprises an interruption region of predetermined length extending along said direction of propagation and located at a predetermined position along said periodically varying diffraction coefficient structure, with said continuous variation of said average value of a diffraction coefficient being interrupted within said interruption region.

4. The optical wavelength bandpass filter according to claim 1, wherein said parameter which continuously varies is a combination of a continuously varying average value of a diffraction coefficient of said periodically varying diffraction coefficient structure and a continuously varying pitch of said periodically varying diffraction coefficient structure, and wherein said interruption portion of said periodically varying diffraction coefficient structure comprises a discontinuity located at a predetermined position along said periodically varying diffraction coefficient structure, with a transition from a first average value of a diffraction coefficient to a second average value of a diffraction coefficient, and also a transition from a first value of said pitch to a second value of said pitch, respectively occurring at said discontinuity.

5. The optical wavelength bandpass filter according to claim 1, wherein said parameter which continuously varies is a combination of a continuously varying average value of a diffraction coefficient of said periodically varying diffraction coefficient structure and a continuously varying pitch of said periodically varying diffraction coefficient structure, wherein said interruption portion comprises an interruption region of predetermined length extending along said direction of propagation and located at a predetermined position along said periodically varying diffraction coefficient structure, wherein said continuous variation of said pitch and said continuous variation of said average value of a diffraction coefficient are respectively interrupted in said interruption region.

6. The optical wavelength bandpass filter according to claim 1, wherein said periodically varying diffraction coefficient structure is formed by selective application of heat.

7. The optical wavelength bandpass filter according to claim 6, comprising heat application control means for dynamically controlling the formation of said periodically varying diffraction coefficient structure by application of selected levels of heat to predetermined locations of said optical fiber or optical waveguide.

8. The optical wavelength bandpass filter according to claim 7, wherein said heat application control means comprises a plurality of heater elements which are disposed upon a section of said optical fiber or optical waveguide and are arrayed successively along said direction of propagation, means for supplying respective levels of current to said heater elements, and means controllable for adjusting said levels of current to produce a desired configuration of said periodically varying diffraction coefficient structure within said section of said optical fiber or optical waveguide.

9. The optical wavelength bandpass filter according to claim 1, wherein said periodically varying diffraction coefficient structure is formed by selective application of mechanical stress.

10. The optical wavelength bandpass filter according to claim 1, wherein said periodically varying diffraction coefficient structure is formed by selective application of electric fields.

* * * * *